Patented July 1, 1941

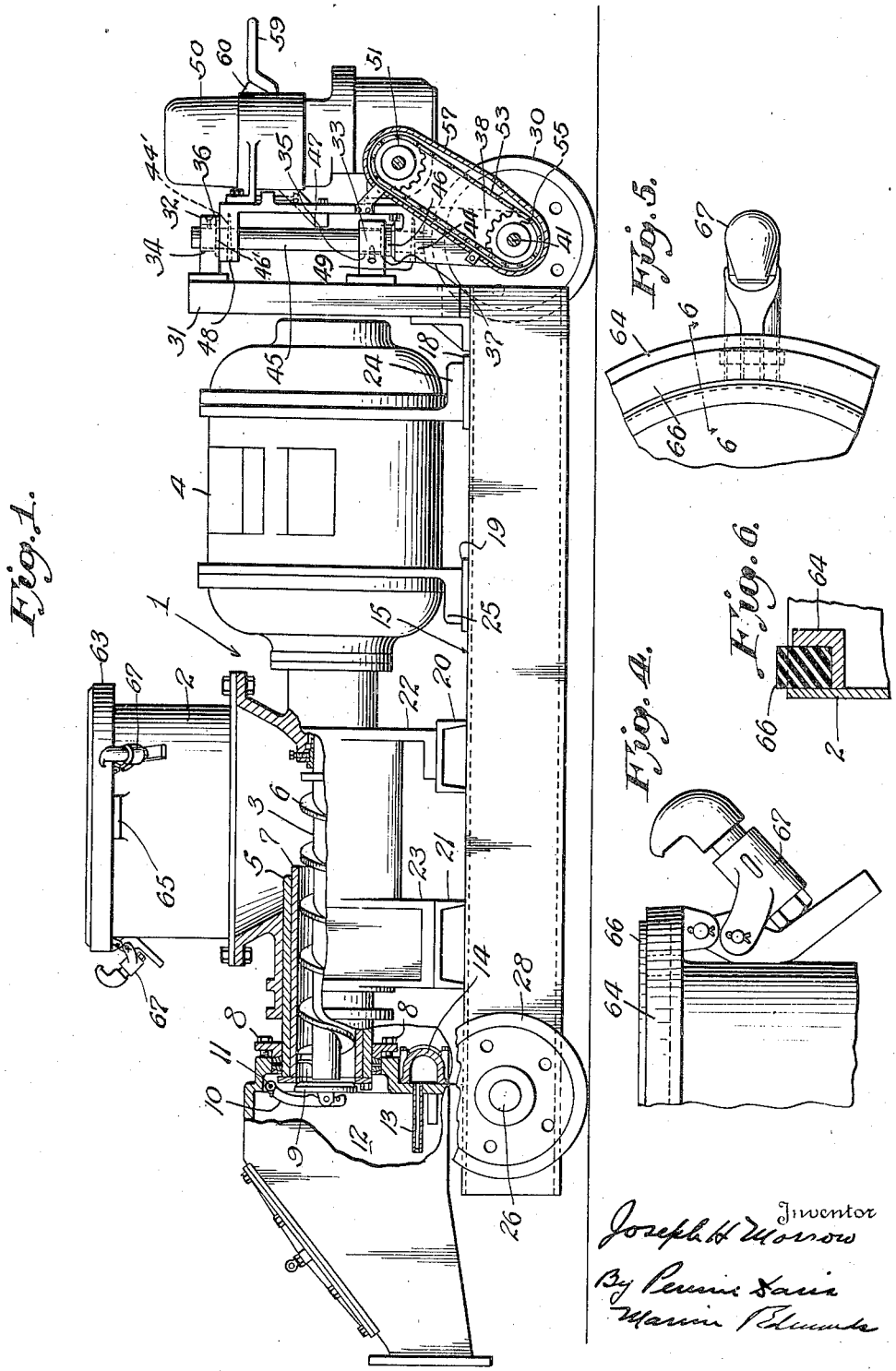

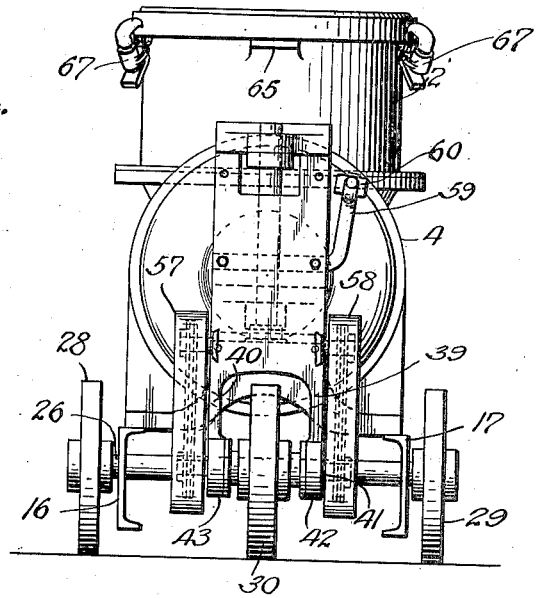
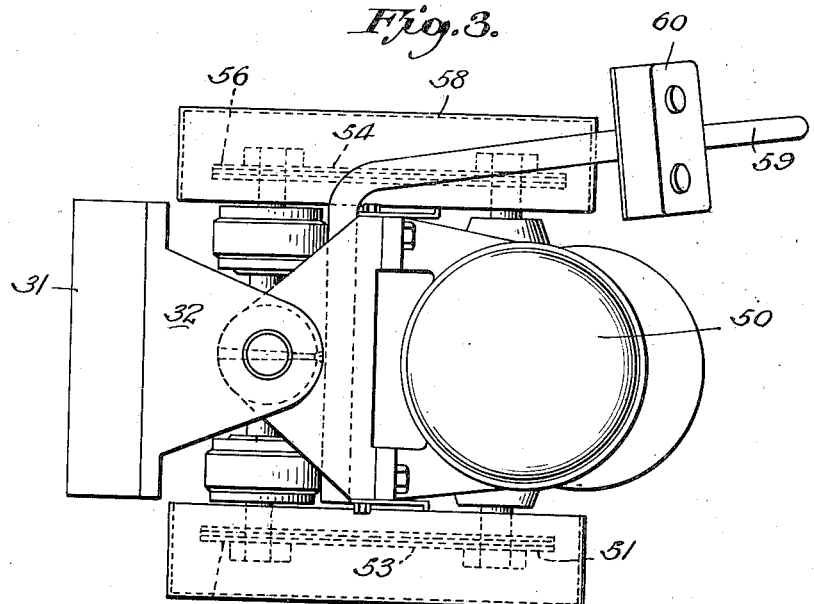

2,247,448

UNITED STATES PATENT OFFICE 2,247,448

CONVEYING APPARATUS

Joseph H. Morrow, Hokendauqua, Pa., assignor to Fuller Company, Catasauqua, Pa., a corporation of Delaware Application August 2, 1940, Serial No. 349,539

3 Claims. (Cl. 214—17)

This invention relates to portable conveyors for dry material of a pulverulent nature of the type in which the receiving hopper of the conveyor may be attached to any one of a number of spaced material source outlets, such as the outlets from storage silos and the like, and in which the material received by the hopper enters a conduit where pressure is applied to advance and compact it, and at a point beyond the point of pressure, gas is injected into the material to fluidize and assist in its movement through the conduit. More particularly, the invention is concerned with a novel mobile supporting structure for the conveyor to facilitate movement in any desired direction, in order that the conveyor may be positioned for direct connection to any outlet of the storage silos or the like.

It is customary in certain industries to provide silos for the storage of large quantities of pulverulent materials, these silos being of considerable height and ranging in diameter from twenty to fifty feet, such storage means being widely used in plants engaged in the manufacture of cement for storing large quantities of both raw and finished products. The bottoms of the storage compartment of the silos are spaced a considerable distance above the floor on which the silos are mounted and are provided with valve controlled openings for discharging the stored material. It is desirable for the operator to withdraw material from different sections of the silos, at certain times, for proper blending and other purposes, and for this purpose it has been common practice heretofore to construct the silos with at least five outlets, four of these outlets equally spaced adjacent the periphery of the base and the fifth located at the center. Also conveyors of this type are used almost invariably to convey cement from silos to packer bins and to cars, truck loading bins, barges and ships.

In the prior art, before the discovery by Kinyon (see Patent No. 1,553,539, Sept. 15, 1925) of a system for conveying pulverulent material through pipe lines, it was the practice to convey the discharged material from the silo to the desired point of delivery by screw conveyors positioned in the floor beneath the center of the silo, or one conveyor extending beneath the centers of several silos in a straight line was used for the total discharge. As the screw conveyor is adapted for use only in straight lines a separate installation was necessary for each silo or line of silos and sloping ducts attached to the spaced outlets adjacent the periphery, and a vertical duct attached to the center opening, direct the material discharged from these openings to a central discharge station positioned beneath the center of the silo and above the screw conveyor.

Upon the development of the Kinyon System to convey material of this nature through pipe lines the necessity for screw conveyors of the type just described was eliminated, but as the use of a pump at each discharge station is too expensive, a further problem is presented, namely the transportation of the pump from one discharge station to another.

A portable conveying assembly including a pump of the Kinyon type presents a number of problems. One of the difficulties arises from the fact that the conveying apparatus is extremely heavy, weighing six to eight thousand pounds, depending upon the capacity, and the hopper of the conveyor must be placed in direct vertical alignment with the outlet duct in order that an air-tight connection may be made. Another difficulty arises from the fact that the space beneath the silos, where the apparatus is used, has a number of obstructions in the form of heavy supporting columns for the silos, thus requiring considerable maneuvering to properly position the device.

In the prior art the transportation of the pump has been confined to movement along guideways in a straight line beneath the centers of a line of silos. In this construction the operator is able to push the pump from one silo to another, but still necessitates a sloping duct arrangement for delivering the material from the spaced outlets to a central discharge station to which the receiving hopper of the pump is attached. As the minimum slope of these ducts for free flowing of the discharged material is approximately 45°, considerable vertical height is required. To deliver the material from an opening adjacent the periphery of a small silo of twenty feet in diameter to the central station requires at least a vertical height of seven feet. Such constructions are extremely expensive, and with the present device unnecessary. Another and more serious disadvantage of the guided conveyor, however, is its lack of flexibility in movement to other outlets or silos, the use of the conveyor being confined to those stations which appear above the guideway. If more than one line of silos are provided, a separate conveyor is necessary for each line. It has been proposed to place beneath the silos a complicated system of guideways in order to move the apparatus from one line of silos to another, but in addition to the expense of maintaining such a system, it has been found to be impracticable to move the present conveyor assembly in other than straight lines.

The present invention is, accordingly, directed to the provision of a portable conveyor including a pump of the Kinyon type, the portable conveyor being so constructed as to be self-propelled and unrestricted in its direction of movement. Thus the conveyor may be positioned for direct attachment to any one of a number of spaced outlets from a storage silo or the like, or positioned for attachment to a central station of a line or lines of silos or the like.

The new conveyor assembly comprises a hopper which may be connected to the desired material outlet duct by a sealing member carried by the hopper. A conduit having communication with the hopper through an opening in one wall thereof receives the material from the hopper, the material being advanced and compacted in the conduit by a screw rapidly rotated by a suitable motor directly connected to the shaft of the screw. A mixing chamber is provided adjacent the terminal flight of the screw, to receive the compacted material, and injector means inject air or other gas into the material in this chamber in order to fluidize it and assist in its travel through the system. The apparatus thus far described constitutes a unitary structure and is rigidly secured to the base of a mobile carriage. The base is mounted for rolling movement on wheels, at least one of the wheels being attached for pivotal movement, a guide rod being suitably connected to the pivotal attachment for this purpose of steering the conveyor to the desired location. The assembly is self-propelled by a motor mounted upon the carriage, and suitable driving connections are made from the motor to at least one of the supporting wheels. Controls for the motor are placed at a point convenient for the operator, and with this construction one operator can transport the assembly to a desired material outlet and make the proper connection.

By use of the new portable conveyor economies are obtained in the number of conveyors required. With silos now constructed with sloping ducts to central discharge stations a conveyor of the present type may be used for attachment to any central station regardless of whether the stations are in a straight line or not. By use of the present invention economies may also be made in future silo construction as the conveyor is readily moved to any position below the silo, thus the base of the silo may be lowered relative to the former construction so as to leave only sufficient room for the operator.

For a better understanding of the invention, reference is made to the accompanying drawings in which Fig. 1 is a side elevation of the assembly with parts broken away for illustration purposes.

Fig. 2 is an end elevation of the device with the forward motor removed.

Fig. 3 is a top plan view of the forward supporting structure.

Figs. 4 and 5 are fragmentary views of a detail.

Fig. 6 is a sectional view taken on line 6—6 of Fig. 5.

Figure 7:
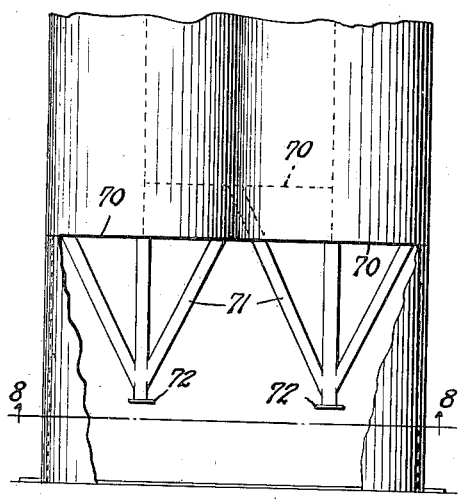
Fig. 7 is a partial elevation of one type of silo construction with parts broken away to illustrate certain details.

Referring to the drawings, the portable conveyor is seen to comprise a pump 1 and a mobile support 15 to which the pump is rigidly attached. The pump consists of a hopper section 2 having a barrel section 5 of relatively short length opening into its front wall, and a screw shaft 3 having flights 6 passing longitudinally through the hopper and extends into the barrel in concentric alignment therewith. The screw shaft passes through the rear wall of the hopper and is supported for rotation in bearings (not shown), beyond which it is coupled with the rotor of motor 4. A liner 7 within the barrel 5 is longitudinally adjustable by means of set screws 8 to vary the distance between the terminal flight of the screw and the end of the barrel, this space constituting a seal to prohibit backward flow of the aerating medium along the shaft. A valve disc 9 connected through an arm 10 to the shaft 11, is free to turn in the walls of chamber 12, this valve preventing backward flow of material upon stopping of the motor. An injector 13 communicating with a source of compressed air or other gas through manifold 14, aerates the material entering the chamber 12 and assists in its movement through the conduit.

The pump thus far described constitutes a unitary structure, and in order that this unit may be transported to desired locations, it is mounted upon a mobile, self-propelled support denoted generally by the reference numeral 15.

The mobile support is seen to comprise a body portion composed of a pair of horizontally spaced longitudinal channel members 16 and 17, to the top flanges of which are secured cross members 18, 19, 20 and 21, thereby providing a rigid base for the pump. Supporting members 22 and 23 integrally cast with the barrel and hopper of the pump, and legs 24 and 25 formed as an integral part of the motor housing, depend from the barrel and motor housing respectively and are securely fastened to the cross members 21, 20, 19 and 18.

A pair of wheels 28 and 29 support the body portion at one end, the wheels being mounted on a common shaft 26 supported by bearings in the opposite longitudinal channels 16 and 17. The other end of the assembly is supported by a single wheel 30, swivelly connected to the carriage in a manner to be described.

An upstanding supporting plate 31 attached to the forward end of the body carries spaced lugs 32 and 33, the lugs having aligned openings 34 and 35, counterbored as at 36 and 37. A shaft 41, fast to wheel 30, supports a fork member 38, having prongs 39 and 40 by means of bearings 42 and 43 carried at the ends of the prongs. The shank of the fork 38 is provided with a bore 44, about which is formed a bearing collar 46. A plate 47 integral with the fork member has its terminal end, remote from the fork, bent at right angle to form an upper bearing member having a bore 44' about which is formed a second bearing collar 46'. In the assembly of the forward supporting wheeled structure, the forward end of the base is raised and then lowered upon the wheel supported fork so as to position the collars 46 and 46' in the counterbore in the lugs 32 and 33. When this position is attained the openings in the lugs 32 and 33 and the opening in the bearing members will be aligned and shaft 45 may be inserted from the top through the four openings. Once the shaft is in place pins 48 and 49 are driven into aligned openings, provided for this purpose, in the shaft and bearing members.

In order to propel the assembly a motor 50, is rigidly supported on the plate 47, and through suitable reduction gearing (not shown) rotates the sprockets 51 and 52, which, through chains 53 and 54 drive sprockets 55 and 56, keyed to the shaft 41. As previously stated, the wheel 30 is fast upon the shaft 41, thus upon rotation of the motor the assembly is caused to move. Guards 57 and 58 surround the exposed driving mechanism for protection of the operator, and a guide rod 59 supported by, and rigidly connected to, the fork member enables the operator to steer the assembly at will. Mounted on the steering rod at a convenient point for the operator is a control box 60, containing push buttons 61 and 62 for selective forward or reverse movement of the driving motor, these push buttons being usually of the type which must be held down by the operator to make connection, to insure against movement of the assembly when the operator is not present. Suitable power connections to the motors may be made in any desired manner.

To insure air-tight connection between the discharge duct and the hopper of the conveying unit, a seal member denoted generally by the reference numeral 63 is provided for this purpose. This seal is seen to comprise an annular member 64 which fits loosely about the outer surface of the hopper wall, and stops 65 spaced about the outside periphery, support the annular member near the top of the hopper when it is not connected to the discharge duct. An annular rubber gasket 66 of substantial depth is carried in an internal recess provided therefor by the member 64, and when the clamping members 67 also carried by the member 64 are attached to the flange of a discharge duct (not shown), the clamps through their toggle arrangement tend to force the annular member 64 upwardly against the flange of the duct. The rubber gasket 66 however, which extends above the member 64 contacts the flange first, and is compressed, thus causing an expansion of the rubber inwardly against the outer surface of the wall of the hopper, thereby forming a tight seal.

Figure 8:
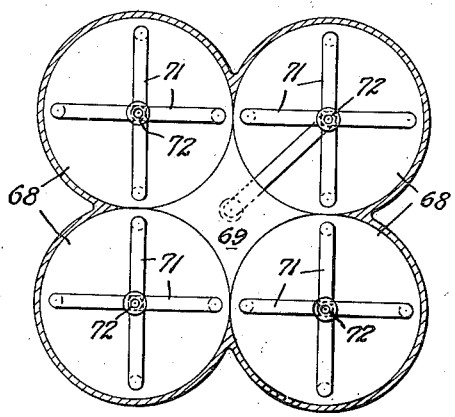
Fig. 8 is a sectional view taken on lines 8—8 of Fig. 7.

The use of the present invention with existing silo construction is shown in Figures 7 and 8. As there shown, silos 68 and included star bin 69 have their bottoms 70 positioned well above the floor by supports (not shown) in order to provide sufficient vertical height for the sloping ducts 71 leading to central discharge stations 72. The portable conveyor of the present invention may be positioned beneath any one of the stations and the proper connections made. Although four silos, in the form of a square, and an included star bin have been shown, it should be clear that due to the unrestricted movement of the present conveyor, any arrangement of silos may be discharged with the present conveyor.

Figure 9:
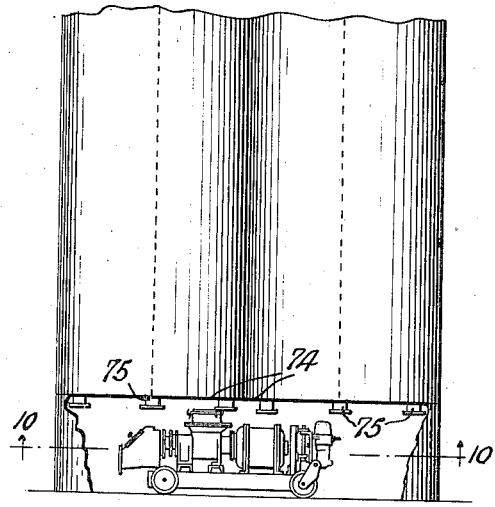
Fig. 9 is a partial elevation of another type of silo construction with parts broken away to illustrate certain details.
Figure 10:
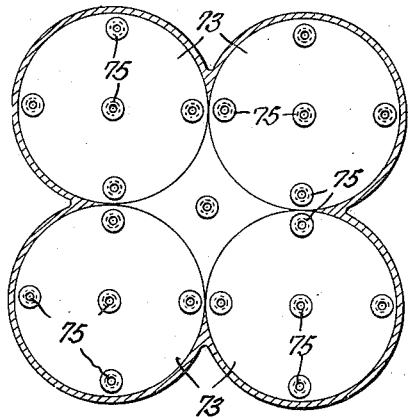
Fig. 10 is a sectional view taken on line 10—10 of Fig. 9.

The use of the present invention for discharging silos, of a construction now possible, is shown in Figs. 9 and 10. As there shown the silos 73 have their bottom 74 positioned a short distance from the floor by supports (not shown) and a short vertical discharge duct 75 is provided at each discharge opening. The new portable conveyor 1 may be positioned beneath the desired discharge duct and the proper connections made. In this type of construction the base of the star bin is on the same level as the base of the silos further increasing the capacity of the bank.

I claim:

1. In a mobile conveyor for discharging pulverulent material from flat bottomed storage silos which are provided with a plurality of spaced short vertical discharge spouts, which includes a pump having a hopper, a conduit communicating at one end with the hopper, means for applying pressure to advance and compact the material in the conduit and means to aerate the material beyond the point of maximum pressure, the improvement which comprises a support for the pump having a base to which the pump is attached, wheels supporting the base for rolling movement, a pivotal connection between the base and one of the wheels, an electric motor drivingly connected to one wheel to propel the assembly, and means for steering the assembly, whereby the conveyor may be maneuvered below a storage silo for selective direct connection of the pump hopper to any one of the plurality of short vertical discharge spouts.

2. In a mobile conveyor for discharging pulverulent material from storage silos having a plurality of short spaced vertical discharge spouts, which includes a pump having a hopper for selective attachment to one of the discharge spouts, a conduit communicating at one end with the hopper, means for applying pressure to advance and compact the material in the conduit to form a seal, and means to aerate the material beyond the seal, the improvement which comprises a tricycle support for the pump having a base to which the pump is attached, a pair of wheels supporting the base at one end, a third wheel, means for pivotally supporting the other end of the base on the third wheel, a guide rod connected to the pivotal supporting means to steer the conveyor, and a motor drivingly connected to the third wheel to propel the conveyor, whereby the apparatus may be maneuvered below a silo for direct connection of the hopper to the desired short vertical discharge spout, thus permitting material from a desired section of the silo to flow directly to the conveying mechanism.

3. In a mobile conveyor for discharging pulverulent material such as cement raw material or finished cement from flat bottomed storage silos provided with a plurality of spaced short vertical discharge spouts, which includes a pump having a hopper, a conduit communicating at one end with the hopper, means for applying pressure to advance and compact the material in the conduit to form a seal, and means to aerate the material beyond the seal, the improvement which comprises a tricycle support for the pump having a base to which the pump is rigidly attached, a pair of wheels supporting the base at one end, a third wheel, a fork member mounted on the third wheel, means pivotally supporting the other end of the base on the fork member, a steering rod secured to the fork member whereby the direction of movement of the conveyor may be controlled, an electric motor also mounted on the fork member, driving connections between the motor and third wheel, and control means mounted on the drive rod to start and stop the motor, whereby the apparatus may be maneuvered below a silo for direct connection of the hopper to the desired short vertical discharge spout, thus permitting material from a desired section of the silo to flow directly to the conveying mechanism.

JOSEPH H. MORROW.